(12) United States Patent
Kolodziel et al.

(10) Patent No.: US 7,347,315 B2
(45) Date of Patent: Mar. 25, 2008

(54) SCRAPER BLADE FOR CONVEYOR BELTS

(75) Inventors: James M. Kolodziel, Grand Rapids, MI (US); Brett Edwin DeVries, Grand Rapids, MI (US)

(73) Assignee: Flexible Steel Lacing Company, Downers Grove, IL (US)

( * ) Notice: Subject to any disclaimer, the term of this patent is extended or adjusted under 35 U.S.C. 154(b) by 0 days.

(21) Appl. No.: 11/235,839

(22) Filed: Sep. 27, 2005

(65) Prior Publication Data

US 2006/0021855 A1    Feb. 2, 2006

Related U.S. Application Data

(63) Continuation of application No. PCT/US2004/009110, filed on Mar. 26, 2004, which is a continuation of application No. 10/400,906, filed on Mar. 27, 2003, now Pat. No. 6,926,133.

(51) Int. Cl.
B65G 45/00 (2006.01)

(52) U.S. Cl. .................. 198/493; 198/494; 198/497; 198/499

(58) Field of Classification Search ............ 198/493, 198/494, 497, 499
See application file for complete search history.

(56) References Cited

U.S. PATENT DOCUMENTS

| 3,952,863 | A |   | 4/1976  | Schattauer |         |
|-----------|---|---|---------|------------|---------|
| 4,098,394 | A |   | 7/1978  | Stahura    |         |
| 4,202,437 | A |   | 5/1980  | Gordon     |         |
| 4,359,150 | A |   | 11/1982 | Bowman et al. |      |
| 4,402,394 | A |   | 9/1983  | Stoll      |         |
| 4,489,823 | A |   | 12/1984 | Gordon     |         |
| 4,529,084 | A |   | 7/1985  | Zhang      |         |
| 4,533,036 | A | * | 8/1985  | Gordon     | 198/499 |
| 4,586,600 | A |   | 5/1986  | Lindbeck   |         |
| 4,598,823 | A |   | 7/1986  | Swinderman |         |
| 4,611,498 | A |   | 9/1986  | Stahura    |         |
| 4,643,293 | A |   | 2/1987  | Swinderman |         |
| 4,658,949 | A |   | 4/1987  | Reicks     |         |
| 4,696,388 | A |   | 9/1987  | Stoll      |         |
| 4,696,389 | A |   | 9/1987  | Schwarze   |         |

(Continued)

FOREIGN PATENT DOCUMENTS

CA    1221050    4/1987

(Continued)

*Primary Examiner*—Gene O. Crawford
*Assistant Examiner*—Leslie A Nicholson, III
(74) *Attorney, Agent, or Firm*—Fitch, Even, Tabin, Flannery

(57) ABSTRACT

A two piece scraper blade is provided that includes a scraper member that is releasably connected to a base member. The scraper member can be of a different material than the base member to provide various advantages including with respect to its wear resistance. Further, in one form, a toolless interconnection is provided for ease in attaching the scraper member to the base member. In another form, the scraper member and base member are provided with engaging surfaces with one of the surfaces including teeth for gripping into the other surface when the scraper member is connected to the base member. In this form, the forces for inserting and removing the scraper member from the base member are greater than the form in which a toolless interconnection is provided, and thus a more robust connection between the scraper and base members is provided thereby.

9 Claims, 5 Drawing Sheets

U.S. PATENT DOCUMENTS

| | | | |
|---|---|---|---|
| 4,779,716 A | 10/1988 | Gordon | |
| 4,825,997 A | 5/1989 | Bowman et al. | |
| 4,854,443 A * | 8/1989 | Gordon | 198/497 |
| 4,917,231 A | 4/1990 | Swinderman | |
| 4,927,003 A | 5/1990 | Swinderman | |
| 4,944,386 A | 7/1990 | Swinderman | |
| 4,953,689 A | 9/1990 | Peterson | |
| 4,969,553 A | 11/1990 | Stoll | |
| 5,031,750 A | 7/1991 | Barnes | |
| 5,088,965 A | 2/1992 | Swinderman et al. | |
| 5,114,000 A * | 5/1992 | Rappen | 198/499 |
| 5,222,588 A | 6/1993 | Gordon | |
| 5,222,589 A | 6/1993 | Gordon | |
| 5,310,042 A | 5/1994 | Veenhoff | |
| 5,344,000 A | 9/1994 | Gleason | |
| 5,373,931 A * | 12/1994 | Barnes et al. | 198/499 |
| 5,378,202 A | 1/1995 | Swinderman | |
| 5,385,507 A | 1/1995 | Swearingen et al. | |
| 5,413,208 A | 5/1995 | Veenhof | |
| 5,725,083 A | 3/1998 | Archer | |
| 5,797,477 A * | 8/1998 | Veenhof | 198/499 |
| 5,944,167 A | 8/1999 | Brink | |
| 5,979,638 A * | 11/1999 | Wiggins | 198/497 |
| 6,315,105 B1 * | 11/2001 | Gibbs et al. | 198/497 |
| 6,986,418 B2 * | 1/2006 | Swinderman et al. | 198/497 |
| 2006/0049023 A1 * | 3/2006 | Dietsch et al. | 198/499 |

FOREIGN PATENT DOCUMENTS

| | | |
|---|---|---|
| CA | 2060165 | 1/1992 |
| EP | 0 251 051 | 1/1988 |
| EP | 0 481 221 | 4/1992 |
| EP | 0 338 118 B1 | 11/1993 |
| EP | 0 574 600 A1 | 12/1993 |
| GB | 1 578 582 | 1/1977 |
| GB | 2 014 530 A | 8/1979 |
| WO | WO 94/00697 | 1/1994 |

* cited by examiner

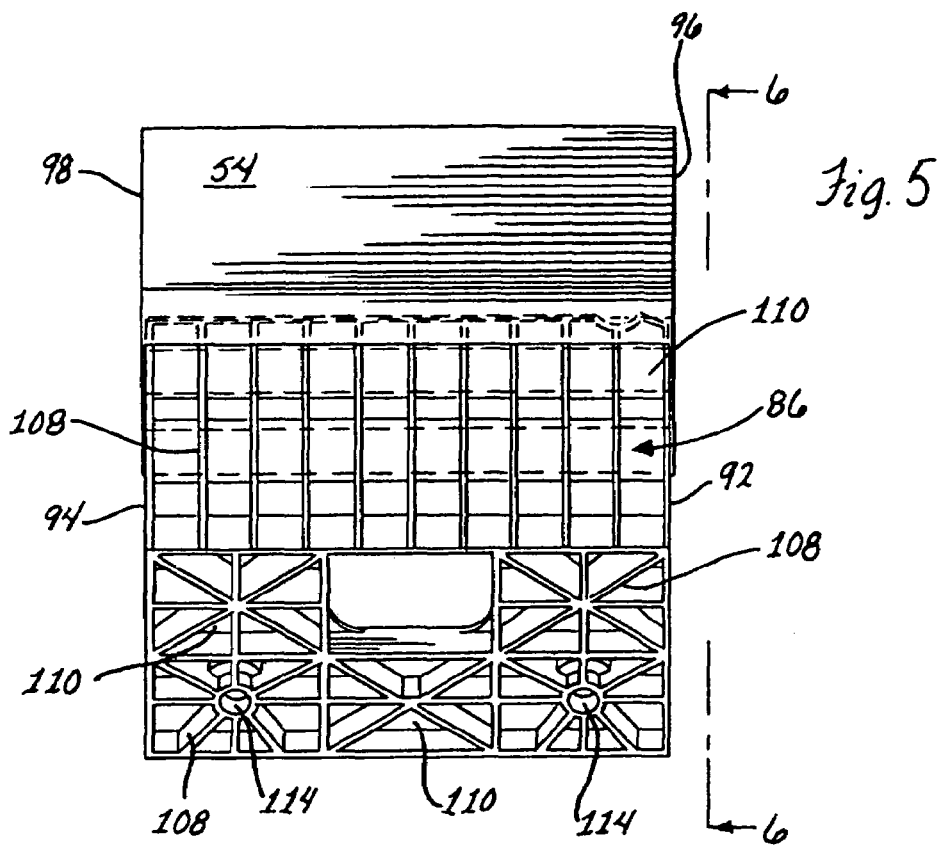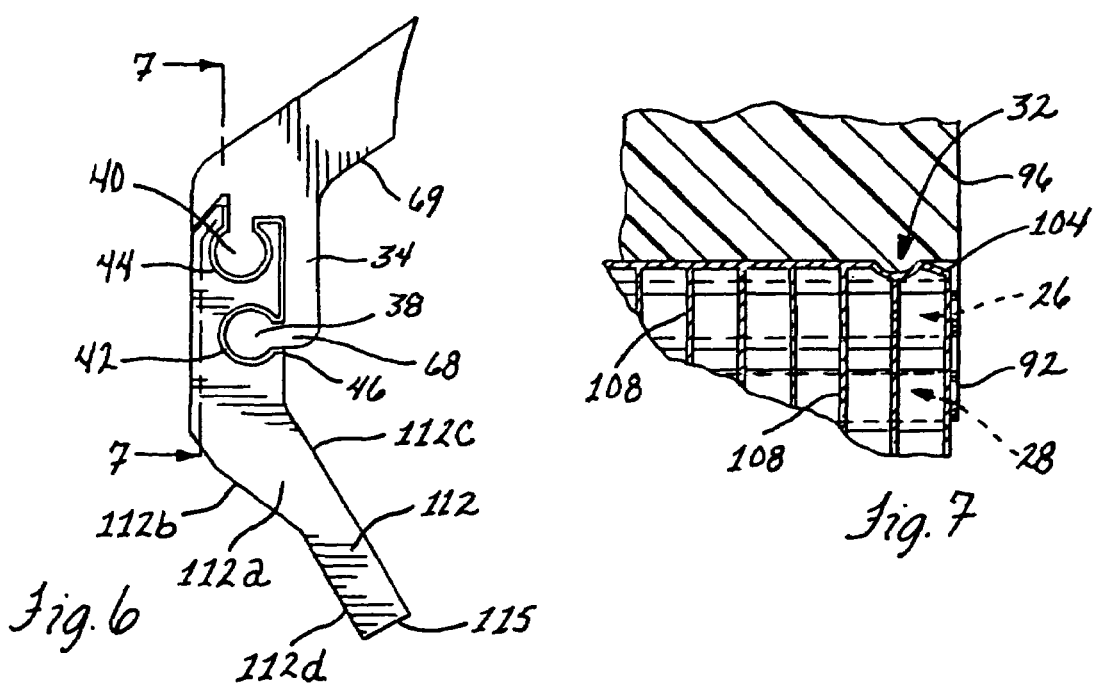

SCRAPER BLADE FOR CONVEYOR BELTS

CROSS REFERENCE TO RELATED APPLICATIONS

This is a continuation application of prior application number PCT/US2004/009110, filed Mar. 26, 2004 which is a continuation of prior U.S. application Ser. No. 10/400,906. filed Mar. 27, 2003 (now U.S. Pat. No. 6,926,113).

FIELD OF THE INVENTION

The invention relates to scraper blades for conveyor belts and, more particularly, to a conveyor belt cleaning apparatus.

BACKGROUND OF THE INVENTION

Conveyor belt cleaners have utilized scraper blades that have tip portions of a predetermined material for providing improved wear resistance. For instance, applicants' assignee herein provides an H-Type® belt cleaner having a cushioning assembly mounted to a support pole extending across the conveyor belt along the bottom thereof. The base portion of the scraper blade of the H-Type® cleaner extends upwardly from the support pole and cushioning assembly toward the belt. At the upper end of the base portion, a variety of different tip end portions are provided for engaging the belt with the material of the tip end portion being based on the cleaning application, and generally having better abrasion resistance than that of the base material for optimizing the wear properties thereof. Another approach is shown in U.S. Pat. No. 5,944,167 where a upper scraper element is molded in situ onto a support element that extends into a downwardly opening pocket formed in the scraping element and thus is integrally attached therewith. One shortcoming of both the blade in the '167 patent and of the H-Type® belt cleaners is once the tip or scraper portions are worn, the entire scraper blade has to be replaced with the attendant costs therefor including both that of the base or support portion as well as the tip or scraper portion thereof. Other approaches include bolted on tips which are undesirable from an ease of assembly and disassembly standpoint. Irrespective of these problems, two-piece blades are desirable from a cost standpoint as the base portion can be of a material that is less expensive than the belt scraper portion. Accordingly, alternative and optimized interconnection structure for two-piece scraper blades over those previously provided as described above would be desirable.

SUMMARY OF THE INVENTION

In accordance with one aspect of the present invention, a scraper blade is provided having lower base member and, in one form, a replaceable upper scraper member that is removably or replaceably received on the base member. The scraper member can be of different material than the base member to provide a performance characteristic that is improved relative to the material employed for the base member such as improved abrasion resistance for a longer wearing scraper blade. Similarly, the spring or damping characteristic of the scraper member can be optimized by its material selection for improving the wear life of the blade. Other performance characteristics that can be controlled by the material selection for the scraper member include its toughness and durability. At the same time, once the scraper member is worn to where it no longer efficiently cleans or to where the base member is now exposed to the conveyor belt, the scraper member can be replaced with another new, unworn scraper member thus obviating the need to replace the entire scraper blade. Accordingly, rather than having to incur the costs of the provision of a new base portion of the blade each time the scraper portion wears out, the present blade allows for the base portion to be reused with a new scraper member rather than necessitating the replacement of the entire blade including its base portion as in prior scraper blades. In one form, the scraper portion is of a urethane material and the base portion is of a nylon material.

Generally, the scraper member will be used with a conveyor belt cleaner apparatus that employs an elongate rigid support member for mounting a plurality of scraper members in side-by-side orientation for scraping across the lateral width of the belt surface. With the two-part scraper blades herein, the base members can have a narrower width than the scraper members releasably connected thereto. In this manner, side ends of the adjacent scraper members can be in close-fitting or engaging relation with each other without encountering interference from the associated base members such as during installation of the scraper blades to the support member. The narrower base members also allow for lower cost manufacture thereof as the tolerances do not need to be as high since there are to be gaps between adjacent base members extending across the belt and along the support member therefor. The lateral gaps between the base members also provide spaces for material to fall through thus avoiding material build-up in the areas around and along the base members.

In a preferred form, the scraper blade includes at least one, and most preferably a pair of interengaging recesses and projections of the base and scraper members. A detent is also provided between the base and scraper members such that when the projection is received in the recess, the base and scraper members are held securely together while still allowing the scraper member to be removed from the base member. More particularly, the detent can include an arcuate cam protrusion that is removably received in an arcuate recess so as to provide a type of snap-fit attachment between the scraper and base members.

In one form, the recesses are formed in the base member and open to either side thereof and the projections are on the scraper member and can slide into the recesses from one side or the other of the base, although it is anticipated that for molding purposes the interengaging portions will preferably include a draft so that sliding of the projections into the recesses will occur from one side of the base. The detent is positioned so that as the sliding of the projections approaches full or complete engagement in the corresponding recesses, the scraper member will snap into place relative to the base member via the snap-fit detent attachment described above.

To this end, the arcuate cam protrusion and corresponding detent seat or recess are disposed toward one lateral end of the blade members. This detent end can be the trailing insertion end of the scraper member so that the opposite leading end of the scraper member is inserted first. In this way, the protrusion does not cause interference with the sliding action between the scraper and base members during scraper blade assembly until the scraper member projection is almost fully slid into its corresponding recess in the base member. In addition, a ramped lead-in surface can be provided adjacent the detent arcuate recess for camming against the protrusion as it is inserted into the projection recess in the base member. It will be understood that the formation of the interengaging projections and recesses and the detent protrusion and recess on the scraper and base members can be substantially reversed from that in the preferred form described herein.

In the preferred form, the scraper member projections include mounting arms having enlarged ends, and the recesses in the base member include access slot portions and enlarged portions for slidingly receiving the mounting arms and their enlarged ends therein. With the projections received in the slotted recesses, the base member will provide resistance to shifting of the scraper during conveyor belt cleaning operations via wall portions thereof extending below and up around along either side of at least one of the ends of the mounting arms, and preferably both of the ends of the mounting arms.

In one application such as where the conveyor belt cleaning apparatus including the scraper blade herein is installed at the head or tail pulleys of the conveyor belt drive system, the scraper blade, and specifically the base member can include an inner surface that generally faces the conveyor belt with at least one of the projections of the scraper member extending down along the base member inner surface. The recess for the projection can open to the inner surface allowing the projection to extend into the recess such that there is an inner portion of the base member in confronting relation with the projection extending along the inner surface thereof. In this manner, the inner portion of the base member resists forces that would otherwise tend to shift the scraper member outwardly away from the belt. With two projections and recesses as in the preferred form, the second projection can extend downwardly from the bottom of the scraper member, and the second recess opens to the top of the base member. The base member can include an upstanding, outer portion that engages against the outwardly facing arm surface of the second projection to resist outwardly directed forces generated during conveyor belt operations.

The scraper member can also be provided with a lower, outer lip extension portion that projects about the upper, outer portion of the base member. The lip portion minimizes access of material to the joint interface between the scraper base members and thus material build-up therein that could make removal of the scraper member from the base member extremely difficult. Accordingly, material scraped off the belt will slide down the outer surface of the scraper member down beyond the top of the base member, and then off the scraper blade so that this material does not have access to the scraper member projections or base recesses therefor.

For strength enhancement purposes, the base member can be formed with a ribbed construction. Preferably, ribs are molded into the base member along the outer side thereof so that they do not face the belt and thus do not provide material build-up areas as in the spaces between the base member ribs.

In addition, the scraper and base members are preferably configured to extend from their interface in an inward direction with the scraper member extending generally toward the belt or pulley about which the belt extends. With this configuration, the scraper tip end portion is in engagement with the belt and the base member will have its lower section extending spaced from the belt generally tangentially thereto. In this manner, there is a clearance spacing between the scraper blade and belt that allows the tip end portion to wear back toward the blade and its joint interface between the scraper member and base member thereof.

In an alternative form, the base member is provided with a plurality of teeth that extend along a laterally extending surface thereof. The scraper member is provided with a corresponding laterally extending surface in facing relation to the toothed surface of the base member. The teeth alternatively could be provided on the scraper member. With the scraper member connected to the base, the teeth grip the corresponding scraper member surface so that the scraper member stays securely connected to the base. Accordingly, the tooth surface of the base can substantially replace the function of the detent so that inclusion of the detent features in the scraper and base members is optional.

In a preferred form where the scraper member includes mounting arm projections with enlarged ends and the base member includes recesses having access slot portions and enlarged portions in which the mounting arms and ends thereof are received, the relative spacing between the scraper member projections and recesses is such that the scraper member is placed under load when connected to the base member. In one form, the base member includes a body in which the enlarged portions of the recesses are formed with these enlarged portions being spaced from each other at a predetermined distance. The enlarged ends of the scraper member mounting arms are also spaced at a predetermined distance, however this distance is sized to be less than that of the distance between the enlarged portions of the recesses in the base member. By increasing the distance between the enlarged portions of the recesses in the base member, the ends of the mounting arms are forced apart from each other as they are slid into the base member recesses. Such loading of the scraper member causes the surface thereof facing the toothed surface of the base member to be drawn tightly into engagement therewith to strengthen the gripping action of the teeth into the facing base member surface. In this manner, a very tight and secure interconnection between the scraper member and base member is achieved.

In the above-described form where the scraper member is preloaded when connected to the base member, it is anticipated that rather than a toolless interconnection the use of tools such as a hammer or the like will be necessary to achieve the secure connection provided between the scraper member and base member by the difference in relative spacings between the projections and recesses as described above. In addition, with the preloaded scraper member connected to the base member such that the base member teeth tightly grip or bite into the material of the scraper member, it is also contemplated that a higher level of force will need to be applied to separate the two from each other such as may be desirable when the scraper member is worn. Alternatively, with the lower cost material utilized for the base member, it is likely just as or more efficient to simply replace both the scraper member and base member when the scraper member is worn.

BRIEF DESCRIPTION OF THE DRAWINGS

FIG. 5 is a front elevational view of one of the scraper blades showing the ribbed construction of the base member;

FIG. 6 is a side elevational view of the scraper blade taken along line 6-6 of FIG. 5 showing the relative sizing of the base and scraper members;

FIG. 7 is a fragmentary sectional view taken along line 7-7 of FIG. 6 showing a detent formed between the base and scraper members;

DETAILED DESCRIPTION OF THE PREFERRED EMBODIMENTS

Figure 1:
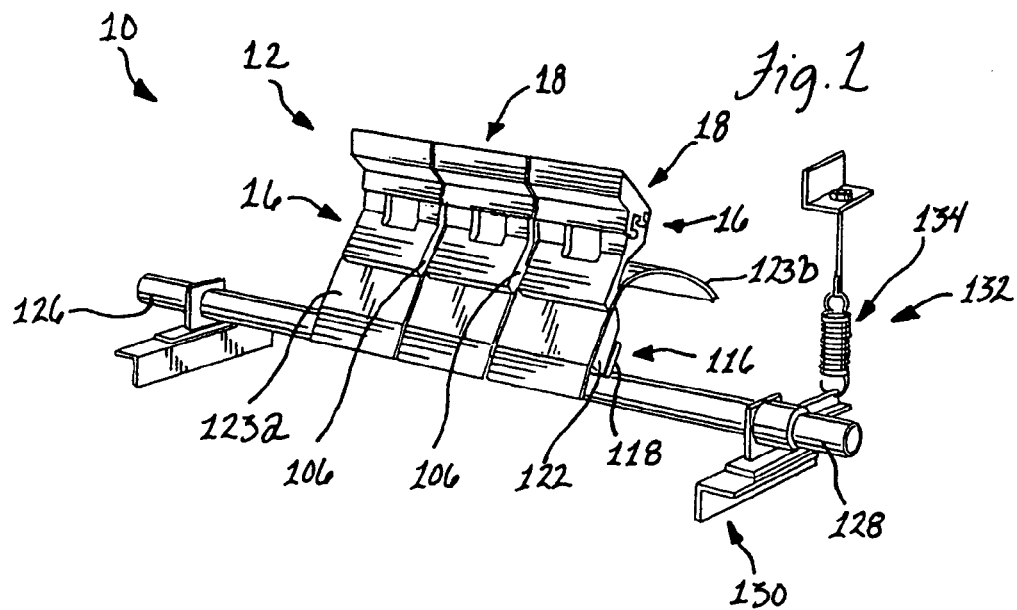
FIG. 1 is a perspective view of a cleaning apparatus for a conveyor belt in accordance with the present invention including a plurality of scraper blades that are biased into engagement with the conveyor belt.
Figure 2:
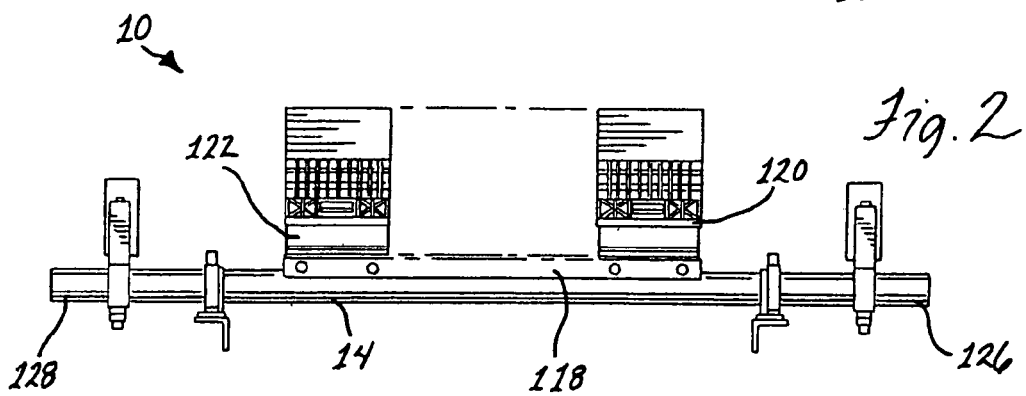
FIG. 2 is a front elevational view of the cleaning apparatus of FIG. 1 showing the scraper blades being mounted to an elongate support pole.
Figure 4:
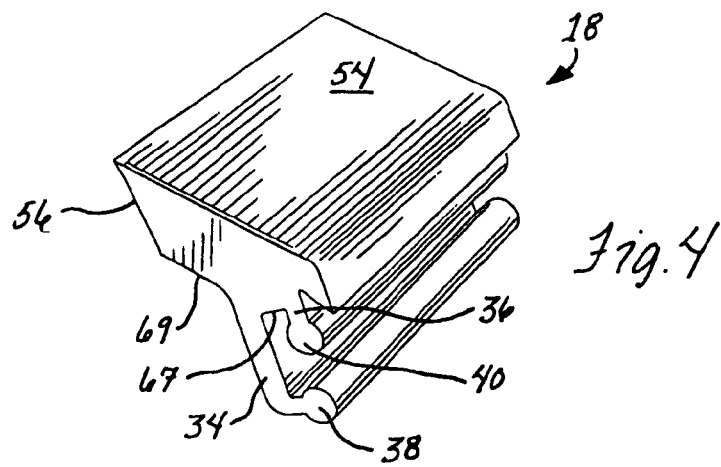
FIG. 4 is a perspective view of the scraper member showing the projections as including a pair of mounting arms each including an enlarged end.

In FIGS. 1 and 2, a conveyor cleaning apparatus 10 in accordance with present invention is illustrated. The cleaning apparatus 10 includes a cleaner or scraper blade 12 that can be supported by a rigid elongate member in the form of support pole 14. The scraper blade 12 has a two-part construction including a lower base member or portion 16 (FIG. 8) and an upper scraper member or portion 18 (FIG. 4) that is releasably connected thereto. In this manner, the scraper member 18 can be of a material, e.g., urethane, that is more abrasion resistant and/or which has better dampening characteristics than that of the base member so as to be optimized from a wear resistance standpoint. In addition, the material of the base member 16 can be selected to be less expensive than the preferred urethane material of the scraper member 18, such as of a nylon material. Moreover, when the scraper member 18 is worn to the point that it no longer efficiently cleans the conveyor belt 20, the worn scraper member 18 can be replaced with a new scraper member 18, thus saving on the expense of replacing the entire scraper blade 12, as necessitated with prior scraper blades having tip portions of different material than the remainder of the blade such as in the '167 patent.

Figure 3A:
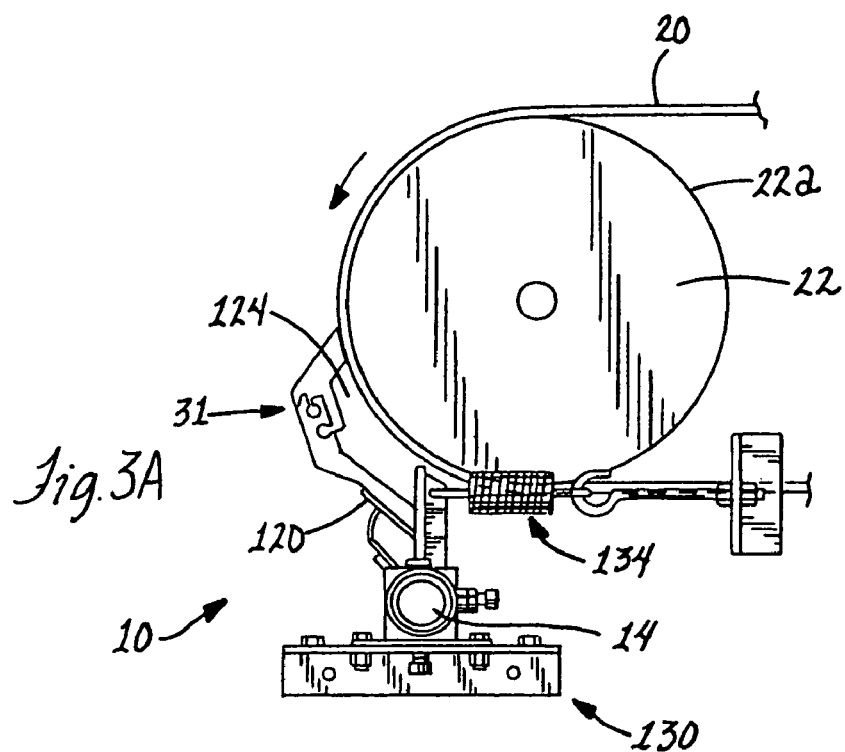
FIG. 3A is a side elevational view of the cleaning apparatus showing a tensioning mechanism at one end of the support pole for adjusting the force with which the scraper blades are biased into engagement with the conveyor belt.
Figure 3B:
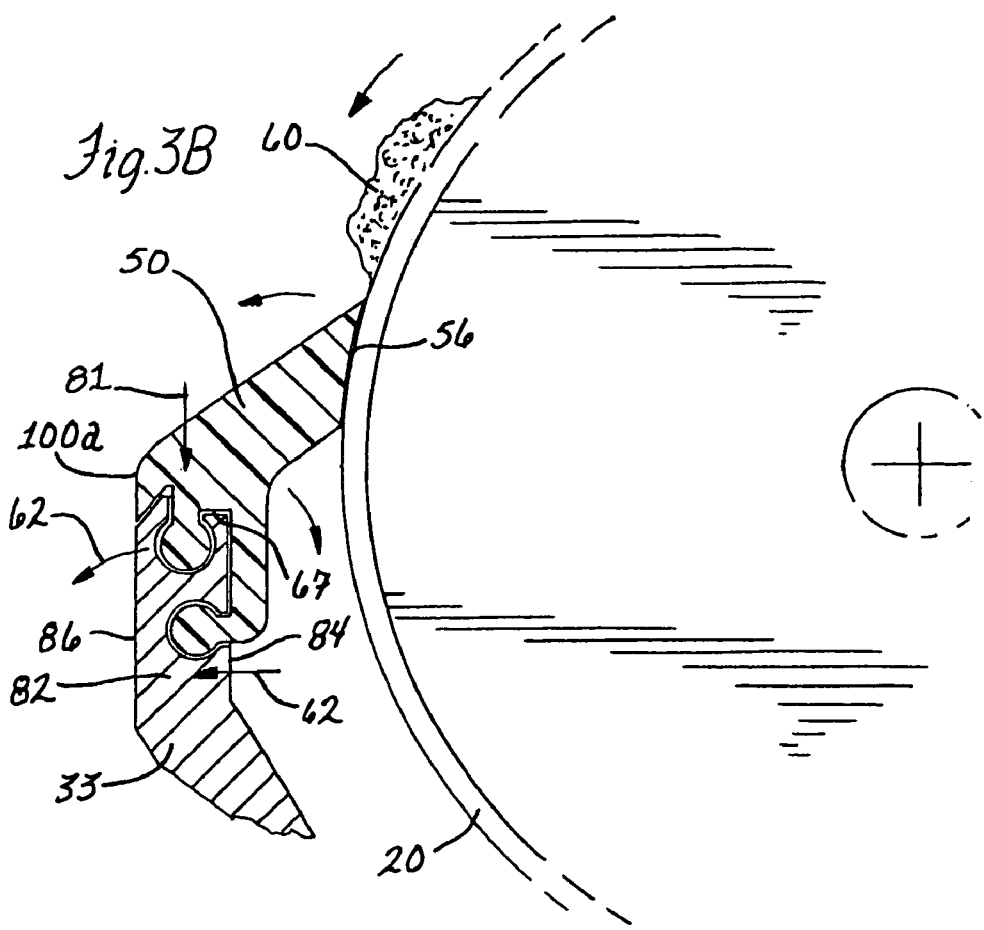
FIG. 3B is an enlarged cross sectional view of one of the scraper blades showing a lower base member and an upper scraper member interconnected by interengaging recesses and projections.

Referring to FIGS. 3A and 3B, it can be seen that the conveyor cleaning apparatus 10 herein is well adapted to be utilized as a primary cleaner such as at the head pulley 22 of a conveyor belt drive system with the belt 20 traveling thereabout. To this end, the present apparatus 10 will be described with respect to the illustrated primary cleaner application; however, it will be recognized that the principles described herein for the scraper blade 12 can be adapted for use at other locations along the belt system, including at the tail pulley and as a secondary cleaner along runs of the belt between the end pulleys thereof. Accordingly, the terminology relating to the orientation of the various portions of the cleaning apparatus 10 will be in reference to the belt 20 as it extends about the head pulley 22, and it will be recognized that these portions will be oriented accordingly depending on the other locations at which the present cleaning blade 12 may be utilized in accordance with the invention herein.

For releasably connecting the scraper member 18 to the base member 16, at least one and preferably two interengaging projections 24 and 26 and corresponding recess openings 28 and 30 are provided to form a joint or interface between the members 16 and 18 generally at the respective upper and lower ends of the bodies thereof. As shown, the locking projections 24 and 26 are formed on the scraper member 18, and the recesses 28 and 30 are formed in the base member 16, although it will be appreciated that they could be reversed with the projections formed in the base member and the recesses formed in the scraper member. It is preferred, however, to have the projections 24 and 26 formed in the scraper member 18 for ease of assembly and disassembly of the scraper member 18 to and from the base member 16. It is also generally preferred that the base member 16 and scraper member 18 be mounted and sized such that the interface 31 therebetween is further from the support pole 14 than the belt 20, as shown in FIG. 3A. More specifically, it is generally preferred that the base member body 33 be larger than the scraper member body 50, and particularly in its longitudinal extent transverse to the pole 14, to provide material cost advantages for the present blade 12 where the base member 16 is made of less expensive materials than the scraper member 18.

The projections 24 and 26 and corresponding recesses 28 and 30 are configured to tightly interfit with each other, such that the scraper member 18 is securely fit onto the base member 18. A detent 32 is also preferably provided between the base and scraper members 16 and 18 for securely and releasably retaining the scraper member 18 on the base member 16, as can be seen in FIGS. 5 and 7 and as will be described more fully hereinafter. In this manner, the scraper member 18 can be assembled with a toolless interconnection to the base member 16, as will be described more fully hereinafter.

The projections 24 and 26 and recess openings 28 and 30 are formed so that the base member 16 resists the forces generated on the scraper member 18 during conveyor belt operations that would tend to shift the scraper member 18 away from the position in which the scraper member 18 is in optimal scraping engagement with the belt 20 such as outwardly away therefrom. To this end, with the projections 24 and 26 received in the recesses 28 and 30, there will be portions of the body 33 of the base member 16 below the projections 24 and 26, and at least on the outer side thereof, and preferably on the inner side as well. For this purpose, in the preferred and illustrated form, the recesses 28 and 30 can have a key-shaped opening configuration, as described more fully herein.

More particularly, the projections 24 and 26 preferably include arm portions 34 and 36, respectively, that terminate in respective enlarged end portions 38 and 40. As shown, the end portions 38 and 40 can have respective annular outer surfaces 39 and 41 which have a larger diameter than the width of their corresponding mounting arms 34 and 36. Similarly, the base member recesses 28 and 30 are provided with a matching configuration to that of the projections 24 and 26 so that they include an enlarged mounting opening 42 and 44 in which the enlarged end portions 38 and 40 of the respective projections 24 and 26 are snugly received. The recesses 28 and 30 further include access slots 46 and 48 through which the projection arm portions 34 and 36 can fit and extend with the end portions 38 and 40 thereof received in the enlarged openings 42 and 44, respectively. The mounting openings 42 and 44 have respective generally annular surfaces 43 and 45 that are of a larger diameter than the width across the corresponding access slot 46 and 48 and only slightly larger than that of the diameters of the arm end portions 38 and 40 fit therein.

Body 50 of the scraper member 18 is configured such that with the member 18 removably connected to the base member 16, there is a inwardly projecting tip portion 52 which is in scraping engagement with the belt 20. The tip portion 52 is bounded by an outer or outwardly extending inclined surface 54 and an innermost surface 56 which meet at the tip end 58 of the scraper member 18. The surface 56 preferably has an arcuate configuration so that it can be biased into flush engagement with the belt 20 as it travels about the outer circumferential surface 22a of the pulley 22, as best seen in FIG. 3B. The upper surface 54 tapers away from the belt 20. In this way, any material or debris 60 carried on the belt 20 passed a discharge point therefrom upstream from the scraper blade 12 will encounter the scraper tip 58 and be scraped off the belt 20 and will ride down under the influence of gravity along the inclined surface 54 of the blade 12 and off therefrom.

Referring to FIG. 3B, it can be seen that the scraping forces generated by engagement of the arcuate surface 56 of the scraper member 18 with the surface of the belt 20 can be generally resolved into downward and outward forces, and torque forces between the base member 16 and scraper member 18. To resist the outwardly directed forces indicated by arrows 62, the projection 24, and specifically the elongate arm portion 34 thereof, extends along an inner surface of the scraper blade 12, and specifically the upper inner surface portion 64 of base member 16. As can be seen in FIG. 3B, the depending arm portion 34 and the confronting inner surface 64 are oriented to extend in a generally transverse direction to that of the outwardly directed forces 62 such that the base member body 33 includes an upper and inner wall portion 66 including the inner surface 64 that resists the forces 62 for keeping the scraper member 18 in scraping engagement with the belt 20 during conveyor belt operations.

More particularly, the arm portion 34 extends down from a flat bottom surface 67 of the scraper member body 50 that extends between the arm portions 34 and 36. On its inner side, the arm portion 34 extends down from inner inclined surface 69 of the scraper member body 50 which is generally parallel with the upper inclined surface 54 thereof.

Figure 8:
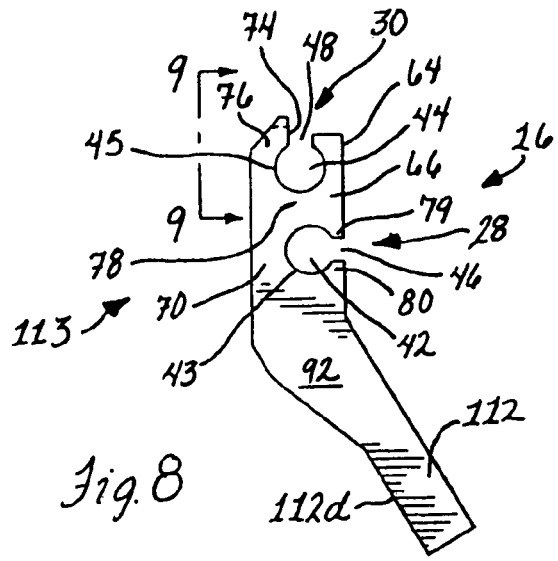
FIG. 8 is a elevational view of the base member showing upper and side slotted recesses for receiving the scraper member mounting arms.
Figure 9:
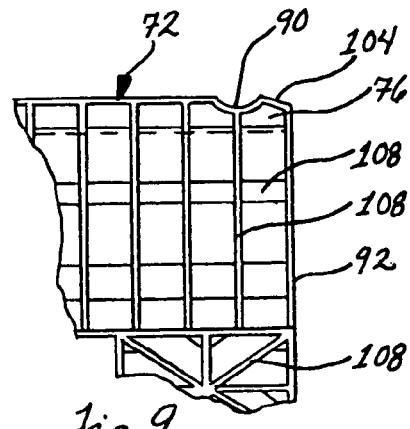
FIG. 9 is a elevational view taken along line 9-9 of FIG. 8 showing an arcuate recess of the detent.

The illustrated projection 24 has a generally L-shaped configuration including a foot portion 68 which extends transversely to the depending portion 34 such as at a right angle thereto from the bottom end thereof in a generally outward direction. At the inner end of the foot portion 68, the enlarged end portion 38 is formed. The mounting opening 42, and specifically access slot 46 thereof, opens to the inner surface 64, as can be seen in FIG. 8. This allows the foot portion 68 to extend through the access slot 46 for positioning the enlarged end portion 38 in the mounting opening 42, as can be seen in FIG. 6. In addition to wall portion 66, the base member body 33 includes an outer wall portion 70 that is disposed on the outer side of the mounting openings 42 and 44. Accordingly, the outer wall portion 70 also resists the outwardly directed forces 62 as exerted by the scraper member end portion 38 on the base body 33.

As can be seen in FIG. 8, the mounting opening 44 has the wall portions 66 and 70 on either side thereof. The opening 44, and specifically the access slot 48 thereof, opens centrally to the upper end 72 of the base member 16. An upstanding inwardly facing shoulder surface 74 is disposed in confronting relation with the outer surface of the arm portion 36 so as to provide resistance against the outwardly directed forces 62 via an upward extension 76 of base member outer wall portion 70. In addition, the base body 33 has an intermediate or centrally disposed wall portion 78 between the inner wall portion 66 and outer wall portion 70 that is disposed below the mounting opening 44. The intermediate wall portion 78 provides a resistance to shifting of the scraper member 18 due to the downwardly directed forces as indicated by arrow 80 in FIG. 3B as exerted by the scraper member end portion 40 on the base body 33.

As previously discussed, the recess opening 28 has narrow access slot 46 leading to the enlarged mounting opening 42 formed in the base body 33. This opening 42 is below the opening 44 such that the intermediate wall portion 78 extends therebetween, as previously described. Because the access slot 46 is narrower than the diameter of the annular surface 43 extending about the opening 42, there is a lower portion 79 of inner wall portion 66 that extends downward along the inner side of the opening 43, and the base body 33 includes a lower, inner wall portion 80 that extends upwardly along the inner side of the opening 43. Further, the mounting opening 43 is formed centrally in the base body 33 such that the outer wall portion 70 extends along the outer side thereof. Accordingly, the outer wall portion 70 serves to resist the outwardly directed forces 62 as exerted by the arm end 38 on the base body 33. Moreover, the inner wall portions 79 and 80 cooperate to keep the enlarged arm end 38 securely received in the opening 42 against being pulled in an inward direction through the narrow slot 46 and out therefrom.

The base member body 33 includes a wall portion 82 that extends between lower inner surface portion 84 and outer surface 86 of the base member 16. The inner surface portion 84 is aligned with the upper inner surface portion 64 and is separated therefrom by the access slot 46. Accordingly, the wall portion 82 is disposed below the mounting opening 42 and serves to resist the downward forces 80 exerted by the mounting arm end portion 38 on the base body 33.

The detent 32 provided between the base and scraper member 16 and 18 can be in the form of an arcuate cam protrusion 88 and an arcuate cam recess or seat 90 which are formed on the scraper member 18 and base member 16, although it will be appreciated that these locations for the cam portions 88 and 90 could be reversed. The cam portions 88 and 90 cooperate to provide a snap fit attachment between the base and scraper member 16 and 18 so that the scraper member 18 is securely retained on the base member 16 when the locking projections 24 and 26 are fully received in the corresponding slotted recess openings 28 and 30 therefor.

More specifically, the openings 28 and 30 preferably extend for the full lateral width of the base body 33 so that they open to either lateral side 92 and 94 thereof.

Accordingly, to insert the locking projections 24 and 26 in their corresponding recesses 28 and 30, the scraper member 18 and specifically the enlarged annular end portions 38 and 40 are slid into the corresponding mounting openings 42 and 44 therefor from one side 92 and 94 or the other of the base member 16. In practice, the base member 16 and scraper member 18 are molded components so that they are provided with a slight draft or incline as extending from one lateral side to the other thereof for ease of removal from the mold cavity. Thus, the scraper member 18 and specifically the locking projections 24 and 26 thereof are unidirectionally insertable into the recesses 28 and 30 from one side of the base member 16. As shown, the scraper member 18 is assembled to the base member 16 from the base member side 92. Accordingly, sides 96 and 98 of the scraper member 18 include a leading side or end 98 that is first inserted from the base member side 92 and then slid down toward the other side 94 of the base member 16 until the locking projections 24 and 26 are fully received in the recesses 28 and 30 therefor and the blade member 16 is snap fit to the scraper member 18 via seating of the protrusion 88 in the cam recess 90 without the need for tools for the scraper blade assembly described above.

To provide ease of assembly and insertion between the scraper member 18 and the base member 16, the detent 32 is formed adjacent the end sides 92 and 96 of the respective members 16 and 18. In this manner, the cam protrusion 88 as shown formed on the scraper member 18 is only in interference with the base member 16 for a short distance at the end of the sliding insertion of the locking projections 24 and 26 into their corresponding recesses 28 and 30.

Figure 10:
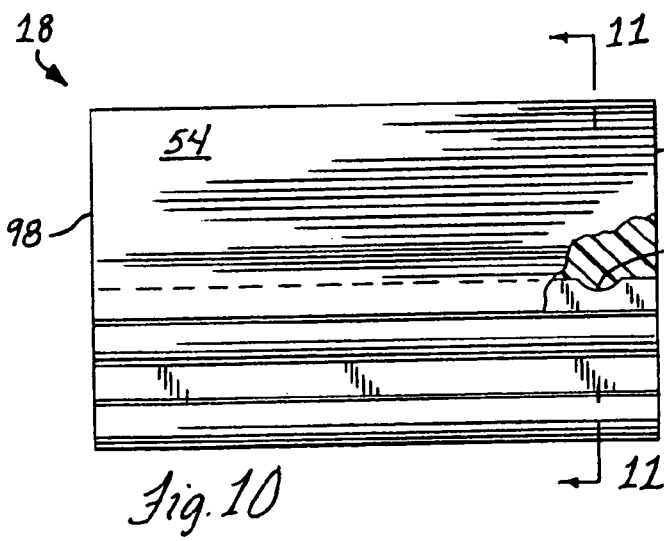
FIG. 10 is front elevational view of the scraper member partially in section to show an arcuate cam protrusion of the scraper member.
Figure 11:
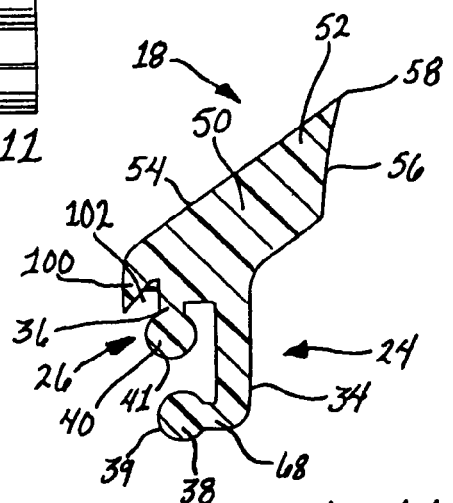
FIG. 11 is a cross-sectional view taken along line 11-11 of FIG. 10 showing an outer, laterally extending lip portion with the cam protrusion formed at a predetermined position therealong.

Referring to FIGS. 10 and 11, the scraper member body 50 includes an outermost portion 100 that depends downwardly in spaced relation to the projection 26 and mounting arm 36 thereof to form a wedge-shaped gap 102 therebetween. The upstanding shoulder portion 76 of the base body 33 has a similar wedge-shaped configuration, as can be seen best in FIG. 8. Accordingly, as the locking projections 24 and 26 are being slid into their recesses 28 and 30, the shoulder portion 76 fits into and slides in the wedge gap 102. As such, the portion 100 forms a protective flap that fits over the upper, outer end portion 76 of the base member 16 so that scraped-off material 60 from the belt 20 slides down the surface 54 and outwardly past the joint interface between the locking projections 24 and 26 and the corresponding mounting recesses 28 and 30 therefor.

The protrusion is formed in the area between the outer lip portion 100 and depending arm portion 36 of the scraper member body 50 a short distance from the side 96 of the scraper member 18. Similarly, the arcuate cam recess 90 is formed in the top end 72 and along the upper wall portion 76 a short distance from the side 92 of the base member 16. Accordingly, there is only a short distance where the arcuate cam protrusion 88 is engaged against the upper end 72 of the base member 16 in interference therewith as the scraper member 18 is being slid to its releasably locked position thereon.

To further lower the insertion forces during assembly of the scraper member 18 to the base member 16, a lead-in ramp surface 104 is provided on the base member upper end 72 so as to extend at an incline from a lower point at the base member side 92 to its upper point adjacent the cam recess 90. Thus, toward the end of the insertion of the locking projections 24 and 26 into their recesses 28 and 30, the arcuate protrusion 88 will cam against the inclined surface 104 with one or both of the base member body 33 and the scraper member body 50 slightly deforming. With continued sliding insertion of the scraper blade 18, the lowestmost point of the arcuate protrusion 88 will be advanced past the highestmost point of the ramp surface 104 and will snap into the corresponding arcuate cam recess 90 to releasably lock the scraper member 18 to the base member 16. To remove a worn scraper member 18 from the base member 16, a force is exerted at the side 98 of the scraper member 18 sufficient to cause the protrusion 88 to cam against the arcuate recess 90 until they are in clearance with each other to allow the scraper member 18 to slide off the base member 16 for replacement with a new scraper member 18. For this purpose, an impact force such as provided by a hammer blow can be employed so that the worn scraper member 18 can be quickly and easily removed from the base member 16.

Referring to FIG. 5, it can be seen that the base member 16 is narrower in its widthwise extent relative to the scraper member 18. Accordingly, with the scraper member 18 releasably locked to the base member 16 as previously described, the sides 96 and 98 of the scraper member 18 will project slightly beyond the corresponding sides 92 and 94 of the base member 16. By way of example and not limitation, the width between the base member sides 92 and 94 can be approximately 7.75 inches, and the width between the scraper member sides 96 and 98 can be approximately 7.83 inches.

With a narrower base member 16, there are provided lateral gaps 106 between adjacent base members 16 along the mounting pole 14. This allows for the tolerances for manufacture of the base member 15 to be larger so that the base 16 can be manufactured at a lower cost, and allows the adjacent scraper members 18 to be in abutting relation without the base member 16 creating interference during their installation. Further, the lateral gaps 106 allow for scraped off material 60 that may access this area around the base member 16 to have space through which the material may fall rather than building up thereat.

Similarly, the base member 16 can be provided with a ribbed construction for strength enhancement purposes while at the same time minimizing the likelihood of material build-up thereon. More particularly, the base member 16 has ribs 108 formed along the outer side 86 thereof so that they face outwardly away from the conveyor belt 20. Thus, as scraped off material 60 rides down the scraper member surface 54, it will be discharged outwardly beyond the ribbed side 86 of the base member 16 so as not to build up in spaces 110 between the ribs 108.

For mounting of the scraper blade 12 to the support pole 14, the base member 16 includes a lower mounting leg portion 112 that tapers at its upper portion 112a and angles inwardly from the wall portion 82 of the base member body 33. The mounting leg portion 112 generally extends in a tangential direction relative to the curvature of the pulley surface 22a and the belt 20 extending thereabout, as can be seen in FIG. 3A. More specifically, the upper region 113 of the base member 16 is generally bounded by the outer surface 86 and the inner surface portions 64 and 84 that are parallel to each other. Upper, outer surface portion 112b tapers inwardly along the upper leg portion 112a relative to inner surface 112c which also extends inwardly relative to surface portion 84. Toward the bottom of the leg 112, lower outer surface portion 112d extends inwardly parallel to the inner surface 112c. By way of example and not limitation, the thickness of the base member 16 at the main upper region 113 thereof across the parallel outer and inner surfaces can be approximately 1.38 inches, with the taper of surface portion 112b being such that the thickness of base leg portion 112 across parallel outer and inner surfaces toward the bottom thereof can be approximately 0.77 inch.

The ribs 108 cooperate to form a pair of bosses 114 (FIG. 5) through which fasteners such as bolts can be utilized to secure the scraper blade 12 to a standard type of cushion assembly 116 that is itself secured to the support pole 14, as can be seen in FIGS. 1 and 2. In this manner, the scraper blade 12 can be utilized with existing equipment for prior conveyor belt cleaning devices. The cushion assembly 116 can include a backing plate 118 that is secured to the pole 14 as by welding and a mounting plate 120 that is fastened to the base member 16. A block 122 of elastomeric material is attached between the plates 118 and 120 which cushions the scraper blade 12 against impacts therewith such as due to splices in the conveyor belt 20 as they travel past the scraper member tip end portion 52 in engagement with the belt 20 during conveyor belt operations. Outer and inner plastic flaps 123a and 123b extend downwardly from the blade 12 about the cushion assembly 116 to keep it free of material 60 scraped from the belt 20.

As previously described, the scraper member 18 extends inwardly toward the conveyor belt 20 from its interface 31 with the base member body 33 which extends downwardly and has leg portion 112 extending in a general tangential direction to the belt 20 down toward the support pole 14. In this manner, a clearance space 124 is provided between the blade 12, specifically the base member 16 thereof and the belt 20. This clearance space 124 allows the scraper member 18 to wear back toward the base member 16 while continuing to be biased into engagement with the belt 20 and without having the base member 16 create interference with the scraping action of the wearing scraping member 18 on the belt 20. In addition, any material that makes it way past the scraper blade 12 is provided with space through which it can fall rather than build up on the blade 12 and associated support structure.

As previously discussed, the base body 33 is preferably larger than the scraper body 50. This positions the interface 31 between the base member 16 and the scraper member 18 closer to the belt 20 than the support pole 14. By this it is meant that the top end 72 of the base member 16 is disposed closer to the belt 20 than the pole 14 as the majority of the scraper member body 50 extends upwardly and inwardly from the top end 72 of the base member 16 at which point the scraper member 18 initially meets the base member 16.

By way of example and not limitation, the linear distance between the bottom end of the base mounting leg 112 and the scraper member top end 72 at the upstanding shoulder portion 76 thereof taken in the direction in which the surfaces 112b and 112c extend can be approximately 6.96 inches. For the scraper member 18, the distance from the bottom of the lower locking projection end portion 38 to the tip end 58 taken in the direction in which the arms 34 and 36 extend can be approximately 5.27 inches. In addition, the distance from the tip end 58 to the outer surface 100a of the lip portion 100 measured in a direction perpendicular to the direction in which the arms 34 and 36 extend can be approximately 3.30 inches. The total height of the assembled scraper blade 12 taken in the direction in which the arms 34 and 36 extend from the upper end 58 to the bottom end 115 can be approximately 9.58 inches.

Turning to more of the details, the pole 14 is mounted at either end 126 and 128 to conveyor support structure generally designated 130. Depending on the width of the belt 20 to be cleaned, the support pole 14 can include a tensioning mechanism 132 at one end such as shown at end 128 in FIG. 1, or at both ends for a larger width cleaning apparatus 10. The tensioning mechanism 132 can be of known construction and will generally include a torsion biasing member. For instance, spring 134 can be provided and arranged to exert a torsion bias force on the scraper blade 12 via the support pole 14 so that the blade 12, and specifically the scraper member 18 thereof has a continuous bias force urging it into engagement with the belt 20 even as the scraper member 18 wears.

Figure 12:
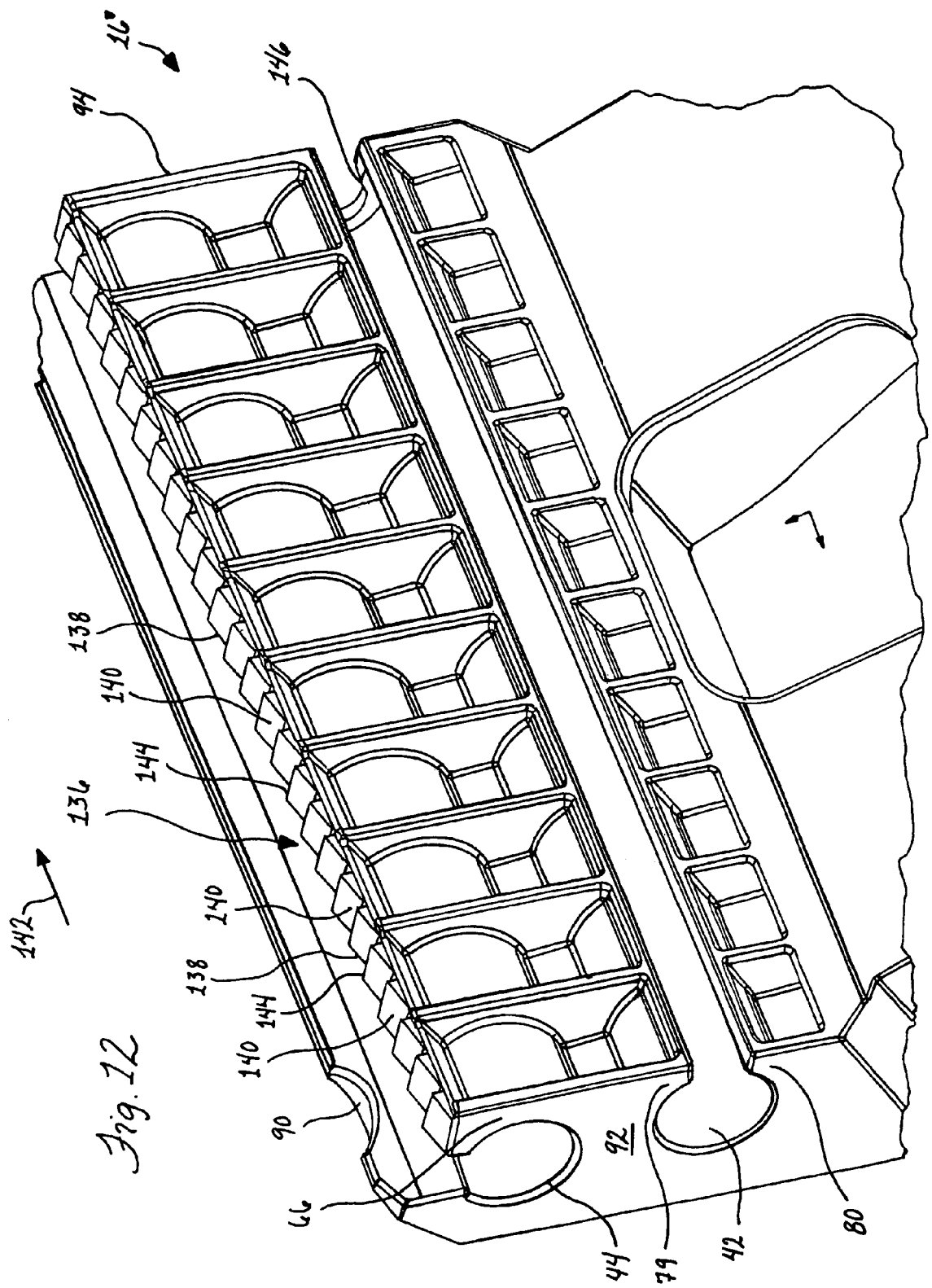
FIG. 12 is an enlarged perspective view of an alternative base member showing a toothed surface extending laterally across the width of the base member.

FIG. 12 shows an alternative form of the base member 16 for use with the scraper member 18. The alternative base member 16' shown in FIG. 12 has the same general construction as the previously described base member 16 and thus features of the alternative base member 16' of FIG. 12 will be provided with the same reference numbers as the corresponding features in the previously described base member 16. The primary difference in structure between the alternative base member 16' and base member 16 is that base member 16' has a serrated or toothed surface 136 that extends laterally across the width of the base member 16', as can be seen in FIG. 12. As shown, the surface 136 includes a plurality of teeth 138 that are configured for gripping the scraper member 18 when the base and scraper members are connected. The teeth 138 provide a very secure connection between the members 16 and 18, particularly where in the preferred form the scraper member 18 is of softer material than the base member 16, e.g., urethane versus a nylon plastic material, such that the teeth 138 bite into the body 50 of the scraper member 18. In this regard, it is to be understood that with the alternative base member 16' the insertion forces for connecting the scraper member 18 to the base member 16' will be higher than that of the previously described base member 16, and the separation forces required for disassembly of the scraper member 18 from the base member 16' will also be greater than that needed for separating the scraper member 18 from the base member 16.

As shown, the toothed surface 136 is preferably provided along the top of the narrow wall portion 66 of the base member 16'. Accordingly, the teeth 138 grip the flat bottom surface 67 of the scraper member 18 that extends between the arm portions 34 and 36 thereof when the scraper member 18 is connected to the base member 16'. Alternatively or in addition to toothed surface 136, other surfaces extending along the body 33 of the base member 16' can be provided with teeth. For instance, the lower surface of the lower portion 79 of the base wall portion 66 extending along the slot 46 can include teeth for gripping the facing upper surface of the foot portion 68 of the arm 34.

As can be seen in FIG. 12, the teeth 138 are arranged on the upper surface 136 of the inner wall portion 66 such that they each include a ramp surface 140 that extends at an incline generally upwardly in the scraper member insertion direction indicated by arrow 142 from insertion side 92 of the base member 16' to the other side 94 thereof. The teeth 138 each include an abutment surface 144 that extends down from the upper end of the ramp surfaces 140 at an angle closer to a 90 degree angle to the insertion direction 142 than the more gradual incline angle formed by the ramp surfaces 140 relative to the insertion direction 142. Thus, as the scraper member 18 is assembled to the base member 16' with the enlarged end portions 38 and 40 of respective arm portions 34 and 36 slidingly received in the respective base member mounting openings 42 and 44, the downwardly facing scraper member surface 67 will cam over the ramp surfaces 140 of the teeth 138. Once the scraper member 18 is in its final assembled or connected position relative to the base member 16', the abutment surfaces 144 of the teeth 138 will resist shifting of the scraper member 18 and particularly the arm end portions 38 and 40 thereof in a direction opposite to the insertion direction 142 so that the end portions 38 and 40 do not back out of the base member openings 42 and 44 at the larger diameter ends thereof.

To further strengthen the connection between the scraper member 18 and the base member 16', the base member 16' is preferably formed so that the mounting openings 42 and 44 are spaced at a slightly greater distance from each other than the spacing of the arm end portions 38 and 40 from one another. More specifically, the openings 42 and 44 have an annular configuration similar to the arm end portions 38 and 40 so it is the centers of the openings 42 and 44 that are spaced at a greater distance than the centers of the arm end portions 38 and 40. As previously mentioned, the scraper member 18 is preferably of a more resiliently flexible material than the base member 16'. In this manner, when the end portions 38 and 40 are slid into their respective mounting openings 42 and 44, the scraper member 16 is provided with a controlled, preload or bias in that the arm end portion 38 and corresponding arm 34 are resiliently deformed or shifted from their normal, unbiased position so that they are stretched or pulled downwardly relatively to the remainder of the scraper member 18. By way of this downward pulling or stretching action generated by the difference in spacing between the arm end portions 38 and 40, and the mounting openings 42 and 44, a controlled, reliable pressure is induced so that the scraper member surface 67 is caused to be pulled into tight engagement with the upper, toothed surface 136. With the surfaces 67 and 136 tightly engaged, the teeth 138 grip tightly onto the surface 67 and may bite into the body 50 of the scraper member so that the scraper member material is interlocked with the serrated teeth 138, particularly where the scraper member is of a softer or more resiliently flexible material, e.g., urethane, than the material of the base member 16, e.g. nylon.

To this end, the insertion forces required for sliding the scraper member 18 onto the base member 16' with arm end portions 38 and 40 fully received in the corresponding mounting openings 42 and 44 will be greater than that required with the base member 16. Accordingly, it is anticipated that a tool such as a hammer or mallet will be desirable for use in connecting the scraper member 18 to the base member 16'. It is further anticipated that the removal or separation forces will be higher for disassembling the scraper member 18 from the base member 16' versus that required for disassembly of the scraper member 18 from the base member 16. In this regard, a power tool such as a press-type apparatus would be required for a disassembly operation. Given the robust strength of the interconnection between the base member 16' and the scraper member 18, it is envisioned that replacement of the scraper member 18 will generally call for replacement of the lower cost base member 16' as well from an efficiency standpoint.

As previously discussed, the mounting openings 42 and 44 are provided with a slight draft so that the diameter thereof is larger at the insertion side 92 of the base member 16' than at the base member side 94. To further ensure that the scraper member, and particularly the arm end portions 38 and 40, do not work their way out of the corresponding mounting openings 42 and 44 as by shifting in direction 142, a stop member in the form of an annular ring or grommet 146 can be provided at the smaller diameter end of one or both of the mounting openings 42 and 44. As shown, the stop ring 146 effectively reduces the diameter of the mounting opening 42 at the base member side 94 so that the end of the arm portion 38 abuts thereagainst. In this manner, the scraper member 18 cannot continue sliding in direction 142 once the arm end portions 38 and 40 are fully received in their corresponding mounting openings 42 and 44 of the base member 16'. With the toothed surface 136 and stop ring 146 of the alternative base member 16', the previously described detent 32 is now rendered optional as the teeth 138 limit any backing out of the scraper member 18 in the direction opposite the insertion direction 142 and the stop ring 146 limits sliding of the scraper member in the insertion direction 142. Accordingly, the base member 16' may or may not be provided with the illustrated cam recess 90, and similarly the scraper member 18 need not be provided with the cam protrusion 88 whether or not the base member 16' includes the cam seat 90.

While there have been illustrated and described particular embodiments of the present invention, it will be appreciated that numerous changes and modifications will occur to those skilled in the art, and it is intended in the appended claims to cover all those changes and modifications which fall within the true spirit and scope of the present invention.

What is claimed is:

1. A conveyor belt system including a scraper blade for cleaning a conveyor belt as the belt travels about a head or tail pulley, the conveyor belt system comprising:

an elongate support member at a position generally lower than the pulley and having a length which extends in a lateral direction across the conveyor belt toward either side thereof;

an upper scraper member having a scraper tip with the upper scraper member configured to extend in the lateral direction and transversely relative to the lateral direction toward the pulley for engaging the conveyor belt traveling thereabout;

a lower base member that supports the scraper member to keep the tip engaged with the belt with the lower base member extending in the lateral direction and transversely relative to the lateral direction away from the support member generally tangentially relative to the conveyor belt extending about the pulley and upwardly toward the upper scraper member so that the upper scraper member and the lower base member generally extend transverse to each other in directions transverse to the lateral direction;

at least one mounting arm that extends from the scraper member and has an end portion with a predetermined configuration;

a mounting opening in the base member that has substantially the same predetermined configuration as the mounting arm end portion to allow the end portion to be tightly received in the opening in a direction substantially parallel to the lateral direction;

lower and opposite side wall portions of the base member below and extending up along the arm end portion received in the base member opening to resist shifting of the scraper member due to scraping forces between the tip and belt, wherein the scraper member and the base member include engaging surfaces with the mounting arm end portion received in the base member opening, and a plurality of teeth on one of the engaging surfaces that grip the other engaging surface to retain the scraper member and base member secured together.

2. A conveyor belt cleaning apparatus comprising:

an elongate support member for extending widthwise in a lateral direction across a conveyor belt toward either side thereof;

a scraper member for engaging a conveyor belt;

a base member for supporting the scraper member;

interengaging portions of the scraper member and the base member for connecting the scraper member to the base member configured so that the scraper member has an insertion direction for connecting the interengaging portions of the scraper and base members together with the insertion direction being generally parallel to the lateral direction;

engaging surfaces of the connected scraper member and base member extending generally parallel to the insertion direction and the elongate support member; and teeth on one of the engaging surfaces for gripping the other engaging surface to provide a secure connection between the scraper member and the base member with the teeth configured to allow the scraper member to be shifted for being connected to the base member in the insertion direction parallel to the lateral direction and to resist shifting of the connected scraping member in a direction opposite to the insertion direction.

3. The conveyor belt cleaning apparatus of claim 2 wherein the interengaging portions are sized to preload the scraper member connected to the base member to controllably bias the engaging surfaces tightly together.

4. The conveyor belt cleaning apparatus of claim 2 wherein the interengaging portions are configured to allow the scraper member to slide to a predetermined connected position relative to the base member with the teeth including ramp surfaces for camming engagement with the other engaging surface as the scraper member slides to the predetermined connected position.

5. The conveyor belt cleaning apparatus of claim 4 wherein the base member includes a stop member to limit sliding of the scraper member at the predetermined connected position.

6. The conveyor belt cleaning apparatus of claim 2 wherein the interengaging portions comprise at least one mounting opening having a predetermined configuration and at least one projection including a portion having substantially the same predetermined configuration as the mounting opening to allow the projection portion to be received therein.

7. The conveyor belt cleaning apparatus of claim 6 wherein the at least one mounting opening comprises a pair of mounting openings spaced by a predetermined distance, and the at least one projection comprises a pair of projections each including end portions with the end portions spaced by a predetermined distance that is less than the predetermined distance between the openings so that the engaging surfaces are drawn tightly together with the end portions received in the mounting openings.

8. The conveyor belt cleaning apparatus of claim 7 wherein the scraper member is of a more resiliently flexible material than the base member to allow at least one of the projections to resiliently deform for fitting the end portion thereof into the corresponding mounting opening.

9. The conveyor belt cleaning apparatus of claim 2 wherein the teeth are on the base member.

\* \* \* \* \*

UNITED STATES PATENT AND TRADEMARK OFFICE
CERTIFICATE OF CORRECTION

PATENT NO. : 7,347,315 B2 Page 1 of 1
APPLICATION NO. : 11/235839
DATED : March 25, 2008
INVENTOR(S) : James M. Kolodziej and Brett Edwin DeVries It is certified that error appears in the above-identified patent and that said Letters Patent is hereby corrected as shown below:

ON TITLE PAGE:
Item (75), Inventors, delete "Kolodziel" and insert -- Kolodziej --.

Claim 2, Column 15, line 2, delete "shifling" and insert -- shifting --.

Signed and Sealed this

Eighth Day of July, 2008

JON W. DUDAS
*Director of the United States Patent and Trademark Office*